June 13, 1944.　　　H. ALLEN　　　2,351,312
GATE VALVE
Filed April 15, 1942　　2 Sheets-Sheet 1

Herbert Allen.
INVENTOR.
BY J. Vincent Martin
Ralph R. Browning
ATTORNEYS.

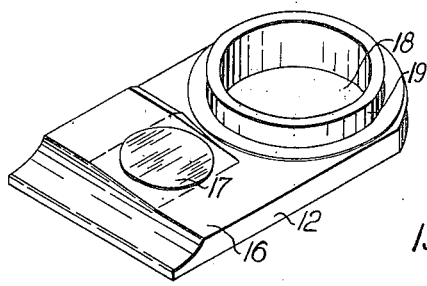
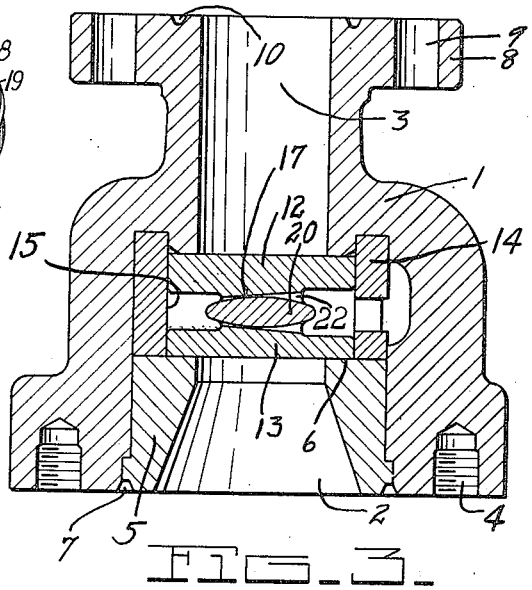
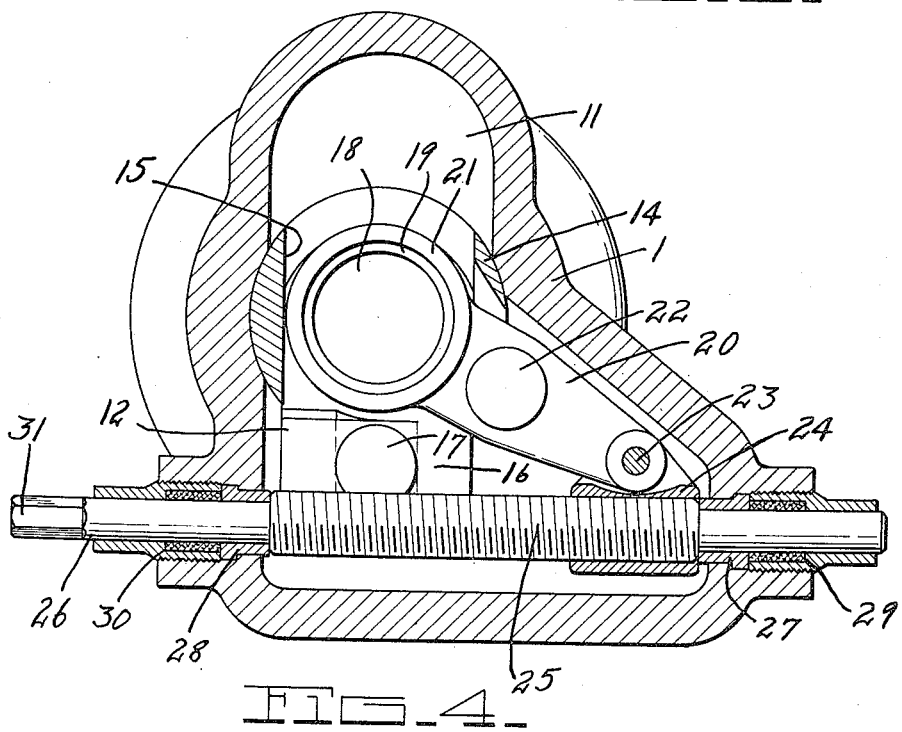

Patented June 13, 1944

2,351,312

UNITED STATES PATENT OFFICE 2,351,312

GATE VALVE

Herbert Allen, Houston, Tex., assignor to Cameron Iron Works, Houston, Tex., a corporation of Texas Application April 15, 1942, Serial No. 438,970

13 Claims. (Cl. 251—68)

This invention relates to a gate valve and has for its general object the provision of such a valve which will be easier to operate and more effective when closed than previously known gate valves.

In the ordinary type of gate valve an operating mechanism is employed which has the same mechanical advantage in operating the gate during the entire time that the valve is being closed or opened. Some gate valves have been provided with means whereby the closure or gate members may be tightly pushed and held against their seats when the valve is closed. In such structures, however, the pushing of the valve against its seat and so to speak locking it in such position takes place simultaneously with the final movements of the valve as the valve is moved toward closed position. This pushing of the valve toward its seat thus serves to further increase the material resistance which is offered to the closing of the valve.

A more specific object of the present invention is to provide a gate valve with an operating means which will be capable of exerting an ever-increasing closing force as the gate moves toward closed position so that the increased resistance of the gate to movement as it moves into the path of flow through the valve will be offset by the ability of the operating means to exert an ever-increasing force on the gate.

Another specific object of this invention is to provide a gate valve having an operating means which is capable of moving the gate toward but not beyond the position where it is intended to seat.

Another object of this invention is to provide a gate valve in which the gate includes a member capable of being moved directly against its seat and forcibly held in place upon its seat after the closing movement of the gate has for all practical purposes ceased.

One other object is to provide a gate valve having an actuating means which is capable of exerting an ever-increasing force upon the gate as it moves the gate toward closed position, and which will not move the gate beyond its closed position but will upon continued actuation after the gate has for all practical purposes reached its closed position move the gate laterally against its seat and hold it there.

Other objects and advantages of this invention will become apparent from the following description taken in connection with the accompanying drawings wherein is set forth by way of example one embodiment of this invention.

In the drawings:

Fig. 3 is a horizontal longitudinal cross section through the same structure taken along the line 3—3 of Fig. 1.

Fig. 4 is a view similar to Fig. 1 but showing the valve in open position.

Fig. 5 is an enlarged perspective of one of the elements going to make up the composite gate of the valve shown in Figs. 1 to 4 inclusive.

Figure 1:
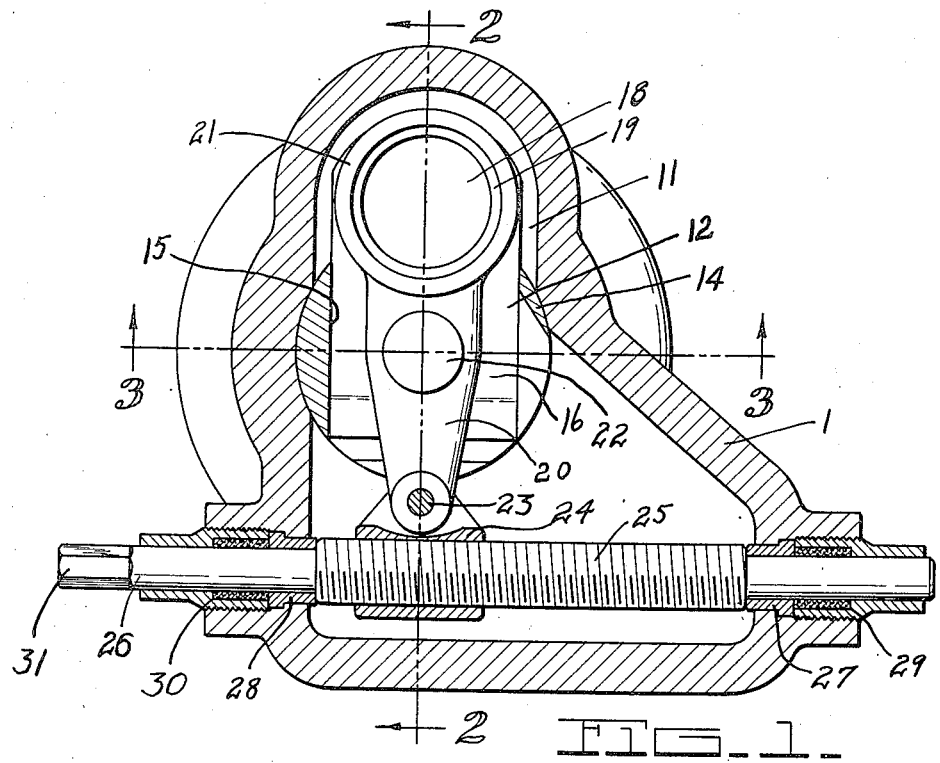
Fig. 1 is a transverse cross section through a gate valve constructed in accordance with this invention showing the gate in closed position.
Figure 2:
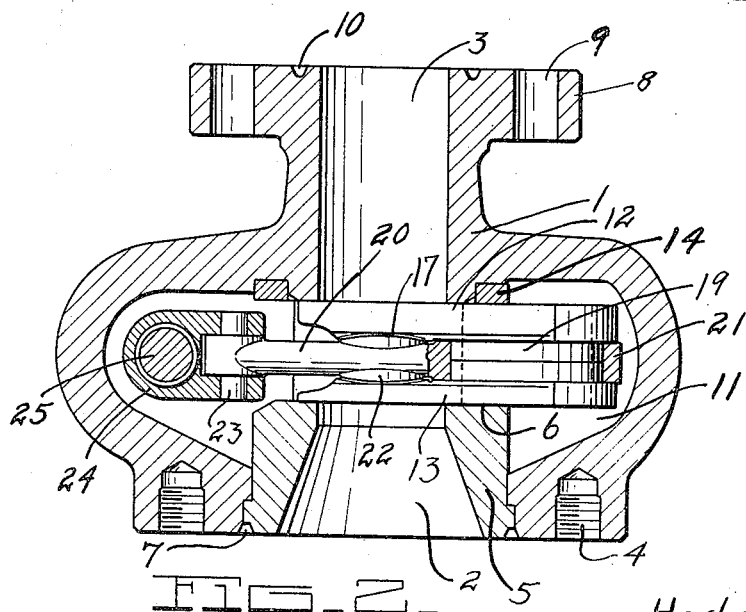
Fig. 2 is a vertical longitudinal cross section of the same structure taken along the line 2—2 of Fig. 1.

Referring now more in detail to the drawings the numeral 1 designates the valve housing having flow openings 2 and 3, one of which may be considered the inlet and the other the outlet. The end of the housing having the opening 2 is illustrated as provided with tapped holes 4 for the purpose of receiving screws whereby a flanged fitting may be secured thereto. The valve seat element 5 is made to be inserted into the open end of the housing and on its inner end provides a valve seat surface 6. On the outer end of the bushing 5 there is provided a notched portion 7 so shaped as to form with the adjacent edge of the housing 1 a groove adapted to receive a metal sealing ring.

On the opposite end of the housing there is shown a flange 8 having bolt holes 9 therein and a ring groove 10 whereby said last mentioned end of the housing may be secured to another flanged fitting or the like.

Intermediate its ends the housing is formed with a chamber 11 in which is housed the valve gate and its operating mechanism.

The valve gate is preferably composed of two slides 12 and 13 respectively adapted to slide in a direction transverse with respect to the direction of flow through the valve. These valve elements are disposed in a lateral guide slot formed in the cylindrical guide member 14 which in turn surrounds the path of flow through the valve and is held in place by the bushing 5. The valve gate elements 12 and 13 are thus guided in their sliding movement by the inner surfaces 15 on the opposite sides of the slot in the guide member 14.

Each of these slides is of substantially the form illustrated in Fig. 5. It will be seen by reference to that figure that each such member includes a relatively flat portion 16, one face of which (that face not shown in Fig. 5) is intended to seat against the end of the intake or outlet opening as the case may be. The other face which is shown in Fig. 5 is provided with an area 17 that is inclined with respect to the seating face for a purpose presently to be set forth. Each such member extends beyond the seating face to provide a portion having an opening 18 therethrough with a bearing flange 19 extending laterally from the flat member 16 in the direction opposite the seating face for the purpose of receiving a part of the operating member.

These two elements of the gate are disposed within the slot in the guide member 14 in back-to-back position, that is, with the surfaces such as shown in Fig. 5 disposed toward each other. Extending between these members is a connecting arm 20 having a bearing ring 21 on one end thereof which bearing ring surrounds the bearing flanges 19 on both of the gate elements. Thus a movement of the connecting arm 20 will serve to move both gate elements simultaneously and the connecting arm 20 may swing about its bearing on the bearing flanges 19. The arm 20 is also provided with oppositely inclined surfaces 22 on its opposite faces, these surfaces being so disposed that when this arm is swung about its bearings on the gate elements the surfaces 22 will engage the surfaces 17 and will serve to wedge the gate elements apart and away from each other. If this occurs while the gate elements are in closed position, it will be seen that the gate elements will be thereby moved and wedged tightly against their seats.

The opposite end of the actuating connecting arm 20 is pivotally secured at 23 to a nut 24 which is in threaded engagement with a screw thread 25 on the actuating shaft 26. This shaft 26 has its end portions smooth and mounted in suitable bearings 27 and 28, these bearings being provided with appropriate packing means 29 and 30 to prevent leakage therethrough from the valve housing. One end of the shaft 26 projects from the housing and is provided with a noncircular portion 31 by which it may be rotated.

It will be noted that the shaft 26 is disposed at substantially right angles to the direction of flow through the valve but offset therefrom, and that it is disposed at substantially right angles to the direction of movement of the gate elements as they move toward or from closed position.

In operation it will be observed that the rotation of the shaft 26 by appropriate means will cause a movement of the nut 24 longitudinally with respect to this shaft. Such movement of the nut 24 will be transmitted through the arm 20 to the gate elements 12 and 13. If these gate elements be initially in the position shown in Fig. 4 the movement of the nut to the left as the device is seen in that figure will cause a movement in an upward direction of the gate elements 12 and 13, this being the direction of movement of these elements toward closed position.

It will be seen furthermore that at the beginning of this movement it will be very rapid and the mechanical advantage of the actuating means will be relatively small. As the movement progresses, however, the speed with which the gate elements move will decrease, assuming that speed of rotation of the shaft 26 remains constant. In other words the mechanical advantage of the actuating mechanism will become greater and greater as the ratio of movement of the shaft 26 to the gate elements 12 and 13 becomes greater and greater.

Finally when the nut 24 reaches a position such that the arm 20 is substantially at right angles to the shaft 26 the upward movement of the gate elements 12 and 13 will cease entirely, the mechanical advantage at this point becoming infinitive. The various parts will be so designed that at this point the gate elements will occupy their fully closed position. Any further movement of the shaft 26 in the same direction will move the surfaces 22 on the arm 20 between the surfaces 17 on the gate elements and wedge these gate elements apart, the gate elements during this time having no movement in a direction toward or from closed position.

From the foregoing it will be seen that during the closing movement of the gate elements of the valve disclosed the mechanical advantage of the operating mechanism is slight at first during the time when the gate elements are not being acted upon substantially by the flow of fluid through the valve. However, as the gate elements move toward closed position and are acted upon more and more by the fluid flowing through the valve, and thus as the frictional resistance to this movement increases, the mechanical advantage of the actuating mechanism increases until finally when the valve reaches closed position the mechanical advantage is infinitive.

Furthermore it will be seen that the movement of the gate elements is completed and these elements are substantially at a standstill before the wedging device forming part of the operating mechanism is brought into place to wedge these elements away from each other.

On opening movement of the valve the reverse action takes place with the wedging portion 22 of the arm 20 being first withdrawn from its wedging engagement with the gate elements. Then as the opening movement begins the operating mechanism has a very great mechanical advantage in the initial movement of the gate. As the gate moves toward open position, however, this mechanical advantage decreases until the valve is completely open again as illustrated in Fig. 4.

From the foregoing it will be appreciated that means have been provided for accomplishing all of the objects and advantages sought by this invention.

Having described my invention, I claim:

1. In a gate valve, a body having a flow passage therethrough, a gate movable laterally with respect to said flow passage to close and open the same, variable mechanical advantage means including a link and a pivotal connection between the link and gate for moving said gate toward closed position with an increasing mechanical advantage as the gate approaches closed position, and means on the link engaging a surface on the gate at a region spaced from said pivotal connection for forcing said gate against its seat at the end of its closing movement.

2. In a gate valve, a body having a flow passage therethrough, a gate movable laterally with respect to said flow passage to close and open the same, variable mechanical advantage means for moving said gate toward closed position with an increasing mechanical advantage as the gate approaches closed position, and wedge means movable independently of and with respect to the gate and engageable with a part of said gate remote from the part of said gate engageable by the gate moving means, and operable at the end of the closing movement thereof to wedge said gate against its seat.

3. In a gate valve, a body having a flow passage therethrough, a gate movable laterally with respect to said flow passage to close and open the same, means having a mechanical advantage variable up to infinity including a link and a pivotal connection between the link and gate for moving said gate toward closed position with a mechanical advantage varying to infinity as said gate reaches its closed position, and means on the link engaging a surface on the gate at a region spaced from said pivotal connection for forcing said gate against its seat when said means approaches a mechanical advantage of substantially infinity.

4. In a gate valve, a body having a flow passage therethrough, a gate movable laterally with respect to said flow passage to close and open the same, means having a mechanical advantage variable up to infinity for moving said gate toward closing position with a mechanical advantage varying to infinity as said gate reaches its closed position, and wedge means engageable with a part of said gate remote from the part of said gate engageable by the gate moving means, and operable at the end of the closing movement thereof to wedge said gate against its seat.

5. In a gate valve, a composite gate comprising a pair of oppositely facing gate elements having seating surfaces on their remote faces and having registering bearing projections extending toward each other respectively, and an actuating arm having a bearing portion extending between said elements and engaging said bearing projections whereby said arm may be moved to simultaneously move said gate elements toward and from closed position, a portion of said arm spaced from said bearing being adapted to be wedged between said gate elements when swung about said bearing, whereby said gate elements may be wedged apart and against their respective seats by a swinging movement of said arm about said bearing.

6. In a gate valve, a composite gate comprising a pair of oppositely facing gate elements having seating surfaces on their remote faces and having registering bearing projections extending toward each other respectively, an actuating arm having a bearing portion extending between said elements and engaging said bearing projections whereby movement of said arm will simultaneously move said gate elements toward and from closed position, means for moving the end of said arm which is opposite said bearing portion in a direction transverse to the direction of movement of said composite gate, and means on the arm engaging surfaces on the gate elements at regions spaced from said bearing projections for forcing the gate elements against their seats as they are moved toward closed position.

7. In a gate valve, a composite gate comprising a pair of oppositely facing gate elements having seating surfaces on their remote faces and having registering bearing projections extending toward each other respectively, an actuating arm having a bearing portion extending between said elements and engaging said bearing projections whereby movement of said arm will cause simultaneous movement of said gate elements toward and from closed position, and guiding and actuating means for moving that end of said arm which is opposite said bearing portion along a substantially straight-line path extending transversely with respect to the direction of movement of said gate toward and from closed position and means for engaging said gate elements at positions remote from said bearing projections for moving said gate elements apart to seat them against their respective seats when they are in positions substantially overlying said seats.

8. In a gate valve, a composite gate comprising a pair of oppositely facing gate elements having seating surfaces on their remote faces and having registering bearing projections extending toward each other respectively, an actuating arm having a bearing portion extending between said elements and engaging said bearing projections whereby movement of said arm will cause simultaneous movement of said gate elements toward or from closed position, a portion of said arm spaced from said bearing being adapted to be wedged between said gate elements when swung about said bearing, whereby said gate elements may be wedged apart and against their respective seats by a swinging movement of said arm about said bearing, and means for moving the end of said arm which is opposite said bearing portion in a direction extending transversely with respect to the direction of movement of said gate toward and from closed position, whereby said gate may be moved toward or from closed position and whereby when being moved toward closed position movement of the gate will cease at the time the arm reaches a position in alignment with the direction of movement of the gate and the gate elements will thereupon be wedged apart.

9. In a gate valve, a composite gate comprising a pair of oppositely facing gate elements having seating surfaces on their remote faces and having registering bearing projections extending toward each other respectively, an actuating arm having a bearing portion extending between said elements and engaging said bearing projections whereby movement of said arm will cause simultaneous movement of said gate elements toward or from closed position, a portion of said arm spaced from said bearing being adapted to be wedged between said gate elements when swung about said bearing, whereby said gate elements may be wedged apart and against their respective seats by a swinging movement of said arm about said bearing, and means for moving the end of said arm which is opposite said bearing portion along a substantially straight-line path extending transversely with respect to the movement of said gate toward or from closed position, whereby said gate may be moved toward closed position until said arm reaches the position in alignment with the direction of the movement of the gate, whereupon swinging movement of said arm about its bearing on the gate elements will serve to cause wedging of said elements apart from each other and against their respective seats.

10. In a gate valve, a gate slidable into and out of the path of flow through the valve to close and open the valve, an arm extending along said gate past the portion adapted to lie in the path of flow while the valve is closed and pivotally secured to said gate beyond such portion, cooperating means on said arm and gate whereby swinging of said arm about said pivotal connection will cause wedging of said gate against its seat when in closed position, and means for moving the end of said arm opposite said pivotal connection along a path extending transversely with respect to the direction of movement of said gate.

11. In a gate valve, a gate slidable into and out of the path of flow through the valve to close or open the valve, an arm pivotally connected to said gate adjacent one end of the arm, means for moving the opposite end of the arm along the substantially straight-line extending transversely with respect to the direction of the movement of the gate, said last mentioned means comprising a nut pivotally secured to said arm, a screw shaft engaging said nut, means for mounting said shaft for rotary movement only with respect to the remainder of the valve, means for rotating the shaft, and means on the arm engaging a surface on the gate at a region spaced from the pivotal connection of the arm to the gate for forcing the gate against its seat as it is moved towards closed position.

12. A gate valve element for a gate valve, such element comprising a substantially flat member adapted to form the closure portion of the gate, an extension on said member having an opening therethrough adapted to register with the path of flow through the valve when said gate is in open position, and a flange surrounding said opening and providing a pivotal bearing adapted to receive an operating member for said gate.

13. A gate valve element for a gate valve, said element comprising a substantially flat portion adapted to form the closure for the valve when the valve is in closed position, said element having a part extending from said flat portion and having an opening therethrough adapted to register with the path of flow through the valve when the valve is in open position, an annular flange extending from said element about said opening at substantially right angles to said elements to provide a pivotal bearing for an actuating member for actuating the gate, the flat portion of said element having one side adapted to seat against a valve seat and having on its other side a part providing an inclined surface adapted to receive a wedge member for wedging it tightly against its valve seat.

HERBERT ALLEN.